United States Patent [19]

Bott

[11] Patent Number: 4,765,383

[45] Date of Patent: Aug. 23, 1988

[54] MOTOR VEHICLE WHEEL WITH INDIVIDUALLY SELECTABLE TWIN PNEUMATIC TIRES

[75] Inventor: Helmuth Bott, Pforzheim, Fed. Rep. of Germany

[73] Assignee: Dr. Ing. h.c.F. Porsche Aktiengesellschaft, Stuttgart, Fed. Rep. of Germany

[21] Appl. No.: 797,830

[22] Filed: Nov. 14, 1985

[30] Foreign Application Priority Data

Nov. 14, 1984 [DE] Fed. Rep. of Germany ....... 3441512

[51] Int. Cl.$^4$ ..................... B60C 11/03; B60C 23/00
[52] U.S. Cl. .................. 152/209 R; 137/224; 141/95; 141/104; 141/198; 141/248; 152/416; 307/10 R; 364/424
[58] Field of Search ........... 152/416, 415, 427, 209 R, 152/209 D, 220, 152; 137/223, 224; 180/209; 141/4, 38, 67, 94, 95, 104, 198, 234, 248; 301/38 S, 40 S; 340/58; 116/34 R; 73/146.2, 146.3, 146.4, 146.5, 146.8; 364/424, 558; 200/61.25; 307/10 R

[56] References Cited

U.S. PATENT DOCUMENTS

| 1,183,106 | 5/1916 | Noonan | 301/38 S |
|---|---|---|---|
| 3,664,709 | 5/1972 | Barr'e | 301/36 R |
| 4,278,121 | 7/1981 | McDonald | 152/209 R |
| 4,287,927 | 9/1981 | Caravito et al. | 152/209 R X |
| 4,313,483 | 2/1982 | Brockmann | 152/416 |
| 4,412,576 | 11/1983 | Nakajima | 152/209 R |
| 4,421,151 | 12/1983 | Stumpe | 152/416 X |
| 4,574,856 | 3/1986 | Graas | 152/209 R |

Primary Examiner—Jerome Massie
Assistant Examiner—Thomas Bokan
Attorney, Agent, or Firm—Barnes & Thornburg

[57] ABSTRACT

A motor vehicle with twin tires which includes one tire with a winter tread and a further tire with a summer tread arranged on a common rim. Each tire is provided with a device for the air pressure regulation for achieving a selective pressure decrease and increase. The device for the air pressure regulation is connected with a device for the air pressure control by way of a common control unit. Actuating switches influencing the control unit serve for the mutually matched pressure adjustment of the tires for the summer and winter operation.

12 Claims, 1 Drawing Sheet

U.S. Patent        Aug. 23, 1988        4,765,383
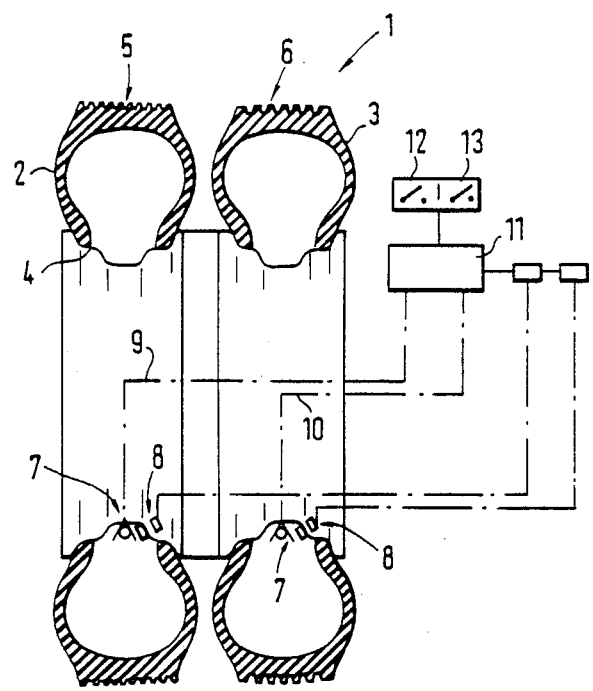

MOTOR VEHICLE WHEEL WITH INDIVIDUALLY SELECTABLE TWIN PNEUMATIC TIRES

The present invention relates to a motor vehicle wheel with twinned tires. Wheels with two tires each on a common rim, so-called twin tires for vehicles, are disclosed in the U.S. Pat. No. 3,664,709. These tires each have the same tread profile for the summer operation. They are provided with an overall width that corresponds altogether to a wheel width of a passenger motor vehicle tire, as is disclosed, for example, from the publication "ADAC Motorwelt" November, 1983, page 45. Wheels constructed in this manner are designed exclusively for summer operation and during winter operation, changing over with tires having a corresponding snow tire tread profile is necessary.

It is the object of the present invention to provide a motor vehicle wheel, by means of which it is possible to operate safely during winter operation as also during summer operation without changing the wheels.

The underlying problems are solved according to the present invention in that the wheel includes a tire having a winter tread profile and a further tire with a summer tread profile arranged on a common rim and each tire is provided with a conventional device for the air pressure regulation to achieve a selective pressure decrease and increase.

The principal advantages achieved with the present invention reside in that by the arrangement of a tire with winter tread profile and of a further tire with summer tread profile on a single rim or on two rims connected with each other, the vehicle can be driven safely under different road conditions. It is thus possible for the driver, for example, to utilize the tires of the vehicle with the winter tread profile during the drive alone in that the air is let out of the tires with summer tread profile, and these tires then no longer contribute to any load-carrying function. Actuating switches serve for the engagement of the pressure regulation for the summer or winter operation during the driving as well as during the standstill of the vehicle. The actuating switches are combined with the control unit in which the regulation of the tire air pressure takes place correspondingly to the desired operation and in dependence on the instantaneously measured tire air pressure. It is thus possible for the driver in a simple manner to utilize with changing road conditions the corresponding tires during the drive without changing tires or wheels.

Tire pressure control systems and tire pressure regulating devices are known as such, and it is possible in a simple manner with the aid of the control mechanism to change the pressure conditions in all tires of the vehicle and to obtain also a control concerning the instantaneous tire pressure for which purposes, for example, corresponding optical or acoustic indicating apparatus may be arranged in the vehicle.

A twin tire arrangement without an installation for the pressure control is also feasible within the scope of the present invention whereby the two tires then would carry the load together.

These and other objects, features and advantages of the present invention will become more apparent from the following description when taken in connection with the accompanying drawing which shows, for purposes of illustration only, one embodiment in accordance with the present invention, and wherein:

The single figure is a somewhat schematic view of one embodiment of a wheel with twin tires and a control system including a tire pressure control device, a tire pressure regulating device, and a control unit as well as with corresponding actuating switches in accordance with the present invention.

Referring now to the single figure of the drawing, a single wheel generally designated by reference numeral 1 of a motor vehicle with two tires 2 and 3 on a common rim 4 is illustrated in this drawing. The outer tire 2 is provided with a summer tread profile 5 and the inner tire 3 with a winter tread profile 6. The tires 2 and 3 may be arranged on a common rim 4—as illustrated—or may also be arranged on a separate rim each which are then connected with each other into a single wheel 1 by corresponding fastening means.

Each tire 2 and 3 is equipped with a device generally designated by reference numeral 7 for the air pressure regulation and with a further device generally designated by reference numeral 8 for the air pressure control. The lines 9 and 10 of the device 7 serve for the air supply and air release; An air chamber is not illustrated in the drawing. The lines 9 and 10 extend to a control unit 11 in which the values of the instantaneous tire air pressure determined by the device 8 are received and are correspondingly processed. Actuating or selection switches 12 and 13 are connected with the control unit 11, whereby the one switch 12 is actuated during winter operation, and the further switch 13 during summer operation. This arrangement with the switches 12 and 13 and the control unit 11 is illustrated only in simplified form and is to illustrate exclusively a possible construction with actuation.

The mixed tires on one wheel with a summer tire and a winter tire is used, for example, with changing road conditions. Thus, with a suddenly occurring snow, a pressure decrease can be achieved in a simple manner in the summer tire 2 by actuation of the switch 12 so that only the winter tire is used for load-carrying function. With snow-free road conditions, in contrast, the switch 13 is actuated, and the pressure in the summer tire 2 is again increased, whereby the pressure in the winter tire 3 is then reduced. The switches 12 and 13 influence the control unit 11 for mutually matched pressure adjustment of the tires 5 and 6 for summer and winter operation.

While I have shown and described only one embodiment in accordance with the present invention, it is understood that the same is not limited thereto but is susceptible of numerous changes and modifications as known to those skilled in the art, and I therefore do not wish to be limited to the details shown and described herein, but intend to cover all such changes and modifications as are encompassed by the scope of the appended claims.

I claim:

1. A motor vehicle wheel comprising twin tire means and a rim means said twin tire means including, one tire means having a winter profile and a further tire means having a summer profile, said twin tire means being arranged on said rim means, and selection means being operable for selecting either of the twin tire means to be a pressurized load-carrying tire means for substantially carrying the load of the motor vehicle and for selecting the other of the tire means to be a non-load-carrying tire means.

2. A motor vehicle wheel according to claim 1, wherein the selection means includes an air pressure regulating means assigned to each of the tire means for achieving a selective pressure decrease and increase.

3. A motor vehicle wheel according to claim 2, said selection means further including a common control unit for controlling the air pressure regulating means and actuating switch means for influencing the common control unit, said selection means providing mutually matched pressure adjustment of the tire means of the motor vehicle having a winter profile and the tire means of the motor vehicle having a summer profile.

4. A motor vehicle wheel according to calim 3, said actuating switch means including one actuating switch for selecting the tire means with a summer profile to be the load-carrying tire means, and another switch for selecting the tire means with a winter profile to be the load carrying tire means.

5. A motor vehicle wheel according to claim 4, wherein the respective non-load-carrying tire means has a lower tire pressure compared to the load-carrying tire means.

6. A motor vehicle wheel according to claim 5, in which the non-load-carrying tire means had a diameter which is reduced by the pressure decrease.

7. A motor vehicle wheel according to claim 6, wherein the tire means having a summer profile for the summer operation is arranged on the outside of the wheel and the tire means having a winter profile for the winter operation at the inside of the wheel.

8. A motor vehicle wheel according to claim 7, wherein said tire means are arranged on a common rim means.

9. A motor vehicle wheel according to claim 1, wherein said tire means are arranged on a common rim means.

10. A motor vehicle wheel according to claim 1, wherein the respective non-load-carrying tire means has a lower tire pressure compared to the load-carrying tire means.

11. A motor vehicle wheel according to claim 10, in which the non-load-carrying tire means has a diameter which is reduced by the pressure decrease.

12. A motor vehicle wheel according to claim 1, wherein the tire means having a summer profile for the summer operation is arranged on the outside of the wheel and the tire means having a winter profile for the winter operation at the inside of the wheel.

* * * * *